United States Patent [19]

Gitzendanner

[11] Patent Number: 4,646,193

[45] Date of Patent: Feb. 24, 1987

[54] DISK CARTRIDGE ASSEMBLY

[75] Inventor: Louis G. Gitzendanner, Oklahoma City, Okla.

[73] Assignee: Magnetic Peripherals Inc., Minneapolis, Minn.

[21] Appl. No.: 703,859

[22] Filed: Feb. 21, 1985

[51] Int. Cl.[4] ............................................. G11B 23/03
[52] U.S. Cl. .................................... 360/133; 369/261; 206/444
[58] Field of Search ................... 360/128, 133, 97, 99, 360/130.3, 130.34; 206/444; 369/291

[56] References Cited

U.S. PATENT DOCUMENTS

| | | | |
|---|---|---|---|
| 3,526,884 | 9/1970 | Buslik et al. | 360/133 |
| 3,772,665 | 11/1973 | Hertrich | 360/97 |
| 3,959,823 | 5/1976 | Heidecker et al. | 360/99 |
| 3,975,768 | 8/1976 | Jacque et al. | 360/99 |
| 4,071,862 | 1/1978 | Lathrop et al. | 360/97 |
| 4,185,314 | 6/1980 | Hatchett et al. | 360/133 |
| 4,223,361 | 9/1980 | Zaitsu et al. | 360/133 |
| 4,358,801 | 11/1982 | Faber et al. | 360/97 |
| 4,360,845 | 11/1982 | Tajima et al. | 360/133 |
| 4,394,700 | 7/1983 | Edwards | 360/133 |
| 4,481,552 | 11/1984 | Dona et al. | 360/133 |

FOREIGN PATENT DOCUMENTS 2257843  7/1973  Fed. Rep. of Germany ...... 360/133

*Primary Examiner*—Robert S. Tupper
*Assistant Examiner*—Andrew L. Sniezek
*Attorney, Agent, or Firm*—Edward L. Schwarz; Joseph A. Genovese

[57] ABSTRACT

A disk cartridge assembly includes a rotatable magnetic disk enclosed within a rectangular cartridge. Attached to the top and bottom covers of the cartridge are a plurality of leaf springs which urge the top and bottom sections toward and against one another. Resilient cloth liners are mounted to the inside surfaces of the top and bottom covers. As the leaf springs urge these sections toward one another, the liners engage the disk surface to prevent the disk from moving freely within the cartridge. The leaf springs are flexible in the axial direction but rigid in the radial direction, thus to maintain the top and bottom sections in alignment with one another.

13 Claims, 10 Drawing Figures

DISK CARTRIDGE ASSEMBLY

BACKGROUND OF THE INVENTION

This invention relates to information storage devices including magnetic disks. To ensure antiseptic conditions, such disks may be permanently enclosed within a disk drive. However, it often is advantageous to house a disk in a removable cartridge, with many such cartridges usable interchangeably on a single disk drive.

While removable disk cartridges no doubt enhance the utility of a single disk drive, they also raise problems not encountered when using permanently enclosed disks. For example, when outside the drive a cartridge must be sufficiently tight to prevent entry of dust, aerosols, and other foreign matter. Direct human contact must be prevented, since fingerprints can damage the disk. Preferably, the cartridge holds the disk firmly, to cushion it against damage, even if the cartridge is accidently jostled or dropped. Yet when loaded into the drive, the cartridge must open sufficiently to free the disk for movement and expose the disk to the signal read and write means (transducer) mounted in the drive. The cartridge must be capable, repeatably, of accurately positioning the disk upon insertion into the drive. Finally, it is desirable to reduce the space needed for storing cartridges, and this necessitates reducing the cartridge thickness or axial dimension.

Prior art devices to counter particulate exposure include a cartridge having a transducer access port, such port being normally closed, but opened by a probe or other means in the drive when the cartridge is inserted. This approach is shown in U.S. Pat. No. 4,412,260 to Stricklin et al. granted Oct. 25, 1983. In U.S. Pat. No. 3,975,768 to Jacque et al. granted Aug. 17, 1976, the drive has a wedge element 46 which forces top wall 42 and bottom wall 41 apart from one another as the cartridge is inserted.

To achieve positioning repeatability, and also to protect against shock, prior art devices attempt to maintain the disk stationary relative to the cartridge when outside the drive. In the Stricklin patent, top and bottom walls 32 and 34 are biased outward to frictionally maintain the hub stationary within the cartridge. Upon loading, the hub is compressed by the cartridge loader in the drive to free the disk, as seen in FIG. 13. U.S. Pat. No. 4,394,700 to Edwards, granted July 19, 1983 shows a plurality of levers 72 biased into contact against the disk hub by coil springs 90. When the cartridge is inserted, release pins push levers 72 against the force of springs 90 to release the hub for rotation. While such frictional mounting is effective in keeping the hub and disk stationary relative to the cartridge, any force due to shock (for example from dropping the cartridge) is transmitted to the disk across the clamped juncture of the disk and hub. This can cause the disk to shift radially relative to the hub and destroy the centering capability.

Cartridge designs frequently involve complex head access door opening and closing mechanisms which usually are compatible with either a linear actuated head or a rotary arm mounted head, but not both. Such mechanisms are prone to wear, generate potentially harmful particles due to such wear, and require increased thickness of the cartridge.

It is an object of this invention, therefore, to provide a cartridge of simple and reliable construction which, when removed from a disk drive, protects its disk from contamination from dust, aerosols and human contact, and maintains its disk stationary without the transfer of undue shock forces through the disk/hub interface. It is a further object of the invention to provide convenient head access for both linear actuated and rotary actuator-mounted heads. Yet another object of the invention is to provide a means for continually urging the cartridge sections or covers together and for maintaining their precise alignment.

SUMMARY OF THE INVENTION

To achieve these and other objects, there is provided an information storage apparatus including an information storage medium and a housing enclosing the medium. The housing includes first and second housing sections opposed to one another, and a connecting means for maintaining the housing sections in an axial alignment with one another and for urging the housing sections toward one another in the axial direction to a closed position. A retaining means is provided, including a first lining means at the inside surface of the first housing section and a second lining means at the inside surface of the second housing section. The first and second lining means engage the medium at opposite sides thereof over a substantial portion of the medium surface area whenever the housing is in its closed position. This substantially prevents any movement of the medium relative to the housing. The connecting means is flexible in the axial direction to permit movement of the sections axially away from one another, thus to disengage the retaining means from the storage medium and permit movement of the medium with respect to the housing.

In one form of this invention, the information storage medium is a rotatable magnetic disk.

Preferably, the first and second lining means comprise a first resilient liner attached to the inside surface of the first housing section, and a second resilient liner similarly attached to the second section. The liners are at least slightly compressed from their normal configuration when the housing is closed. Not only does this increase the frictional force holding the medium relative to the housing, but it also ensures positive contact between the medium and each liner, despite surface irregularities in the medium or either liner.

The connecting means can comprise a plurality of elongate leaf springs, each with one end attached to the first housing section and the opposite end attached to the second housing section. The springs are pre-biased to urge the sections together, yet can flex to allow the required axial separation when the housing is loaded into a read/record apparatus, e.g., a disk drive. The leaf springs can be arranged either longitudinally along two opposed side edges of the housing, or positioned at each corner of a square housing and directed diagonally. The diagonal arrangement affords equal access for a transducer arm to any of the four housing sides, thus to give the cartridge four-sided functional symmetry. There is no "wrong" way to insert the housing into the drive.

It is advantageous to provide a flexible sealing ring running along the perimeter of one of the housing sections. When the sections are drawn together in response to the connecting means, the sealing ring is compressed between them, readily adjusting to any surface irregularities over the contiguous area between the first and second sections.

The connecting means keeps the housing closed when out of the drive to protect the medium against fingerprints or dust and other foreign matter. Yet, because the connecting means is substantially rigid in non-axial directions, there need be no auxiliary structure (e.g., interlocking edges) to keep the housing sections aligned. This permits a substantially flat and thin housing section design. Consequently, when the sections are pulled apart in a drive, a relatively wide transducer "access window" is formed on all sides of the housing. The flat housing sections also minimize the residual volume into which dust and aerosols can be introduced. The retaining means protects against damage from shock, by providing a frictional holding force over substantially the entire medium surface. This avoids the problems of stress concentration at prior art "buttons" or similar localized holding structure. The four-sided functional symmetry provided by the square design with diagonally positioned leaf springs also eliminates the possibility of harm from improper insertion of the housing into an information read/record device.

IN THE DRAWINGS

The above and other features and advantages are more readily understood upon reading the detailed description of the invention in view of the drawing, in which.

DETAILED DESCRIPTION OF THE PREFERRED EMBODIMENTS

Figure 1:
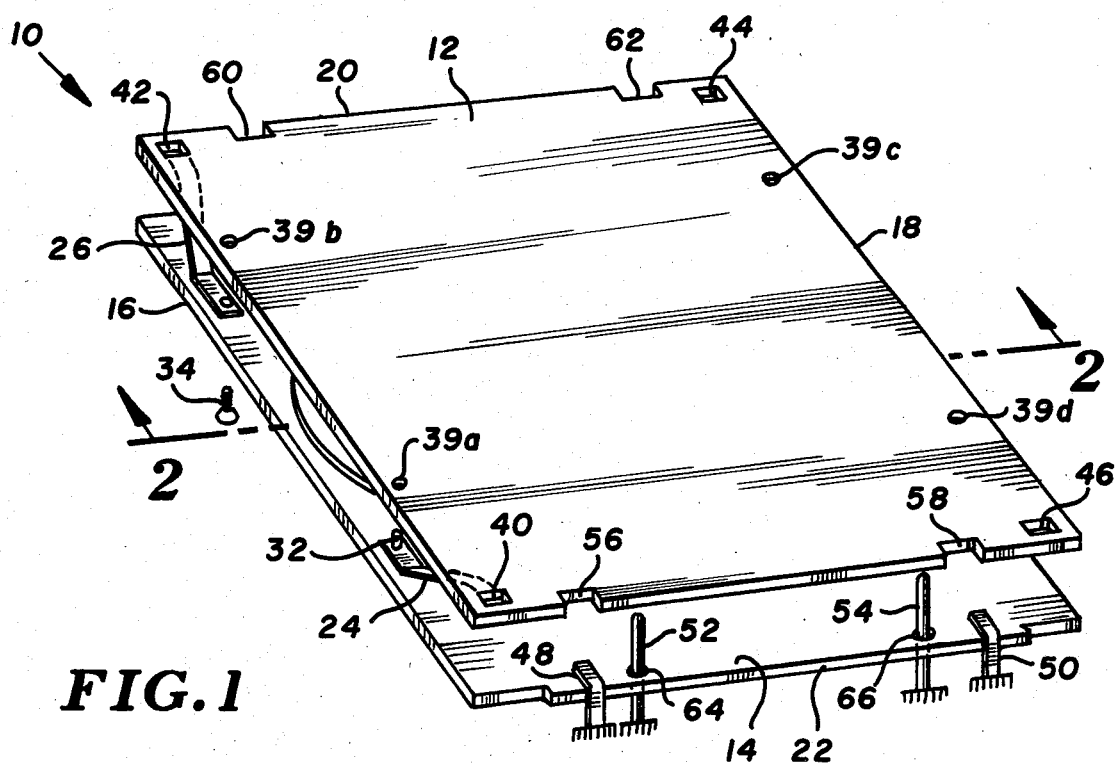
FIG. 1 is a perspective view of a disk cartridge construction illustrating a first embodiment of the present invention.
Figure 2:
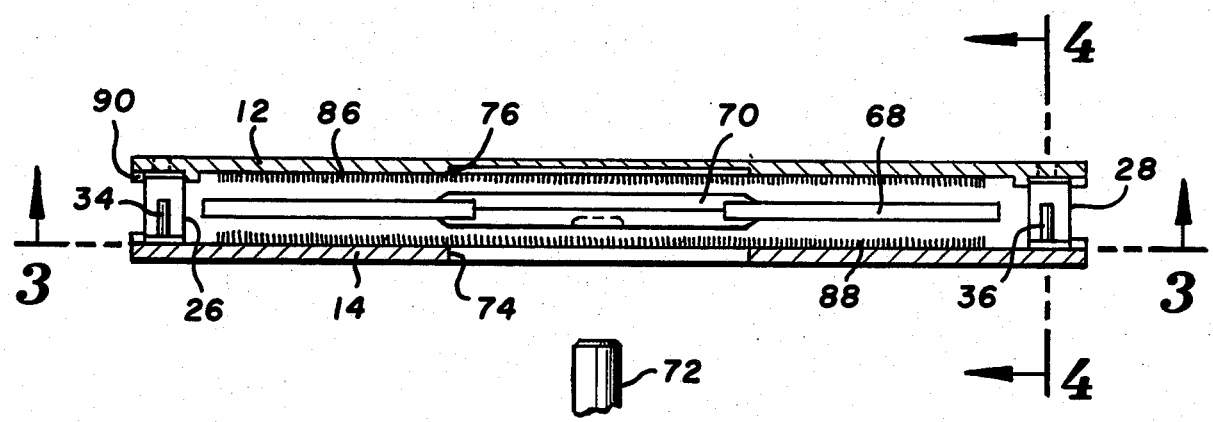
FIG. 2 is a sectional view taken along the line 2—2 in FIG. 1.

Turning now to the drawing, there is shown in FIGS. 1 and 2 a disk cartridge assembly 10 including a rotatable magnetic information storage disk contained within the housing having a first housing section or top cover 12, and a second housing section comprising a bottom cover 14. Cartridge assembly 10 is rectangular, with a forward edge 16, a rearward edge 18, and side edges 20 and 22. Covers 12 and 14 continually are urged toward one another by a connecting means which consists of four elongate leaf springs: a first spring 24, a second spring 26, a third spring 28 and a fourth spring 30. Springs 24 and 26 are arranged longitudinally along and parallel to forward edge 16, with springs 28 and 30 similarly arranged proximate rearward edge 18. Each spring is fastened to bottom cover 14 with a flat head screw. Mounting springs 24 and 26 are, respectively, screws 32 and 34. Leaf springs 28 and 30 are similarly attached. Clearance openings 39a, 39b, 39c and 39d accommodate the flat head screws when cartridge assembly 10 is closed. The opposite end of each leaf spring is contained within one of four rectangular pockets 40, 42, 44, and 46, formed in top cover 12.

Figure 4:
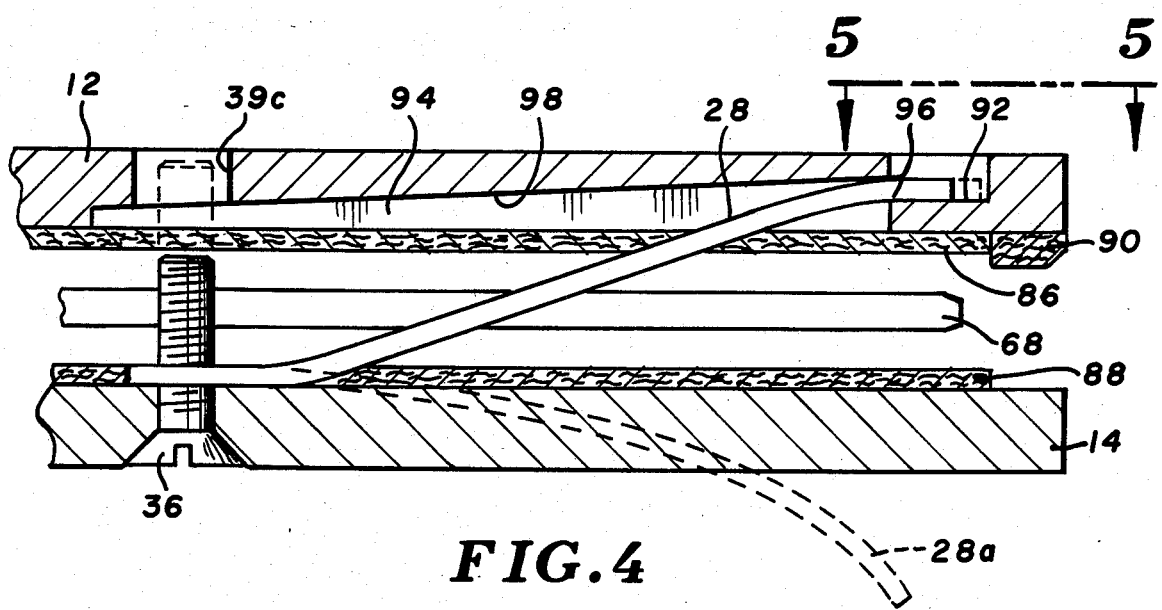
FIG. 4 is an enlarged sectional view taken along the line 4—4 in FIG. 2.

All four springs are pre-biased and, if not under any external stress, would assume the arcuate shape of the broken-line representation of spring 28 in FIG. 4. Consequently, with their outward ends inserted into their respective pockets, the leaf springs cooperate to continually urge cartridge covers 12 and 14 toward one another to maintain cartridge assembly 10 closed whenever it is not loaded into a disk drive. In response to a forcing means in the disk drive, for example four hooks, two of which are shown in FIG. 1 at 48 and 50, and four pins, two shown at 52 and 54 mounted to the disk drive frame, covers 12 and 14 are moved apart from one another against the force in the leaf springs. Notches at 56, 58, 60 and 62 are provided in top cover 12 to accommodate the hooks, while bottom cover 14 includes four openings, two of which are shown at 64 and 66, for accommodating the pins. Cartridge 10 is shown in FIG. 1 in its loaded or open position. Prior to removal of the cartridge from the drive, pins 52 and 54 (and the two not shown) are retracted to allow the cartridge to close.

As best seen in FIG. 2, a magnetic disk 68 is housed in cartridge assembly 10 between the top and bottom covers. Disk 68 includes a centrally located hub 70 which joins to a drive spindle 72 by state of the art means through a spindle opening 74 in bottom cover 14. A recess 76 in the top cover accommodates the hub. Also shown in FIG. 2 is flat head screw 36 used to fasten leaf spring 28 to bottom cover 14.

Figure 3:
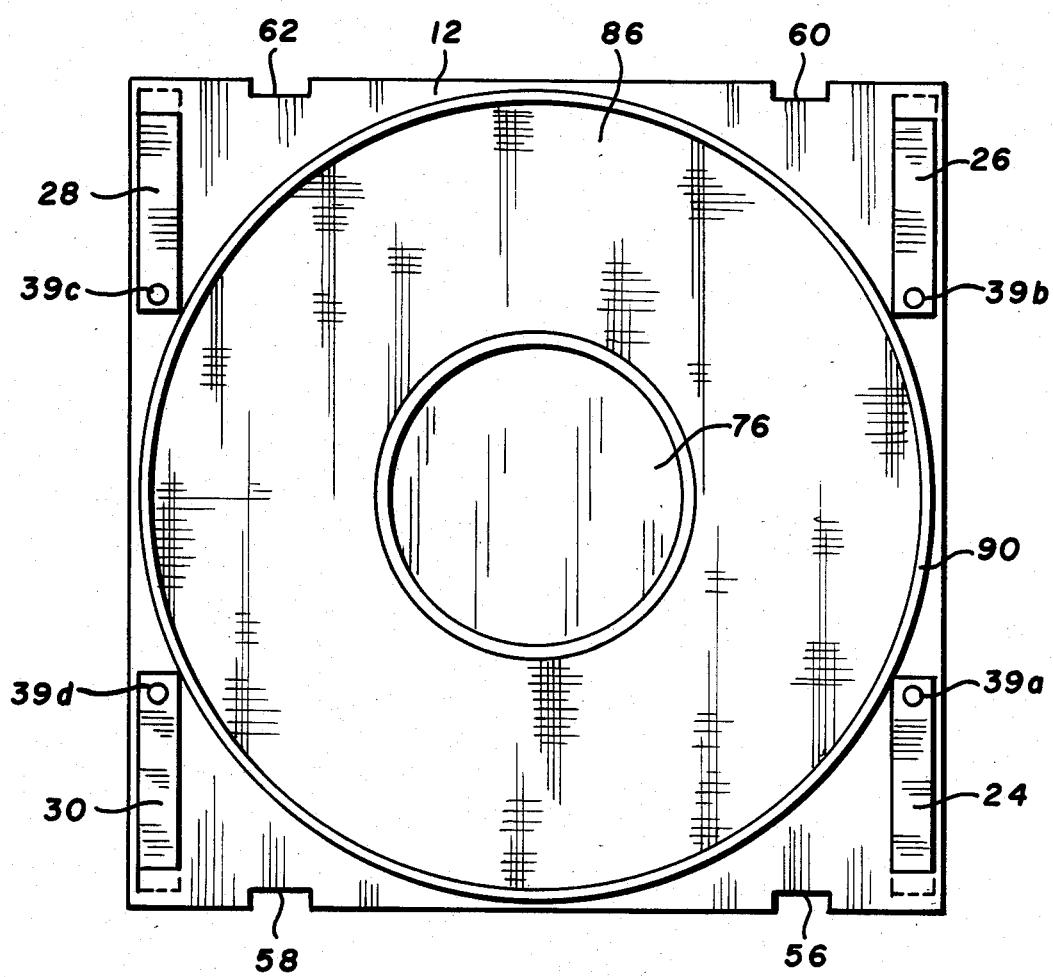
FIG. 3 is a bottom plan view of the upper section of the disk cartridge.

FIG. 3 shows the bottom or inside surface of top cover 12. To an annular portion of this surface is mounted a first resilient liner 86. Preferably, liner 86 is formed of a wear-resistant, non-abrasive, non-woven cloth that is chemically compatible with disk 68, e.g., cotton. The inside surface of bottom section 14 has a corresponding annular surface area to which is attached a second liner 88 (FIG. 2) substantially identical to first liner 86.

Also mounted to the inside surface of top cover 12, near the perimeter of first liner 86, is a flexible sealing ring 90. The sealing ring preferably is constructed of a flexible, non-contaminating material such as neoprene, butyl or polypropylene. When cartridge assembly 10 is closed, sealing ring 90 elastically deforms to accommodate any surface irregularities in the inside surface of bottom cover 14 at the annular surface portion contiguous with the ring. In cooperation with liners 86 and 88, ring 90 seals cartridge assembly 10, when closed, to protect disk 68 from contamination by dust and other foreign matter. Should the hub 70 and resilient liner 88 not provide a sufficient seal, an inner sealing ring may be mounted to cover 14 near the rim of spindle opening 74. The sealing ring or rings, though not essential, enhance the level of disk protection.

FIG. 4 shows in greater detail that portion of the cartridge assembly proximate leaf spring 28. The spring is pre-stressed, and would assume the form shown by the broken lines at 28a in the absence of intervening structure. Actually the free end of spring 28 tends to press downward against a shelf 92 of pocket 44. Extended inwardly from the pocket to a point slightly beyond clearance opening 39c is a tapered channel 94. This channel accommodates leaf spring 28 to prevent it from interfering with the positive contact between covers 12 and 14 required for cartridge closure. Channel 94 is open to pocket 44 through a window 96 defined by shelf 92 and an inclined surface 98 of the channel. The height of window 96 is slightly greater then the spring thickness, so that the spring's free end can slide relative to pocket 44, longitudinally or to the left and right as viewed in the figure. When the cartridge is closed, this free end almost contacts an outer wall 100 of pocket 44.

Figure 5:
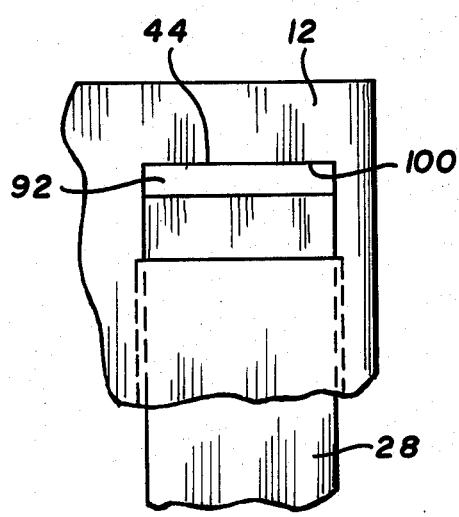
FIG. 5 is an enlarged view taken along the line 5—5 in FIG. 4.

From FIG. 5 it is seen that the width of window 96 is slightly greater than that of spring 28. This prevents any pocket (and top cover) movement relative to spring 28 and transversely of the spring, yet permits the aforementioned longitudinal sliding movement. This figure also shows the gap between spring 28 and pocket wall 100. This gap is nearly closed when the cartridge is closed.

The remaining leaf springs and pockets function as described for spring 28 and pocket 44. Bent from their normal stress-free configurations, the leaf springs store sufficient energy to keep the cartridge firmly closed. The opposing elastic forces of liner 86, liner 88 and sealing ring 90, are readily overcome by the leaf spring closing force. No additional closing means is required. The close fit of each spring in its corresponding window, the virtual elimination of the gap between each spring and its corresponding pocket outer wall when the cartridge is closed, and the stiffness of the springs in all radial directions, together maintain the radial alignment of covers 12 and 14 relative to one another.

Disk cartridge assembly 10 when closed, is positively held together to protect disk 68 from dust or other particulate matter, and from any direct user contact. Also, with the disk closed, liners 86 and 88 are compressed, each between its associated cover and disk surface. This provides a frictional and elastic force acting substantially over the entire surface of disk 68, which tends to hold the disk immobile with respect to the cartridge. Should the cartridge assembly be dropped or otherwise suffer shock, the impact is spread over the entire disk surface to avoid any undesirable stress concentrations. This virtually ensures that the shock does not disturb the position of the disk with respect to its hub, a result critical to repeatability in disk centering, since it is through the hub that disk centering is accomplished.

When loaded into a disk drive, the closing force of the leaf springs is overcome by structure in the drive, such as the hooks and pins discussed above, for axially separating top and bottom covers 12 and 14. Given the thin, flat configuration of the covers, and the arrangement of leaf springs along the forward and rearward cartridge edges, side edges 20 and 22 present relatively large openings for access by a read/write transducer and its support structure. Consequently, cartridge assembly 10 can accommodate either a linear or rotary actuator for the head support arm. Also, the cartridge affords two-sided functional symmetry in that it can be inserted into a drive with either forward edge 16 or rearward edge 18 as the leading edge. By making edges 20 and 22 longer than edges 16 and 18, improper cartridge insertion is completely prevented.

Figure 6:
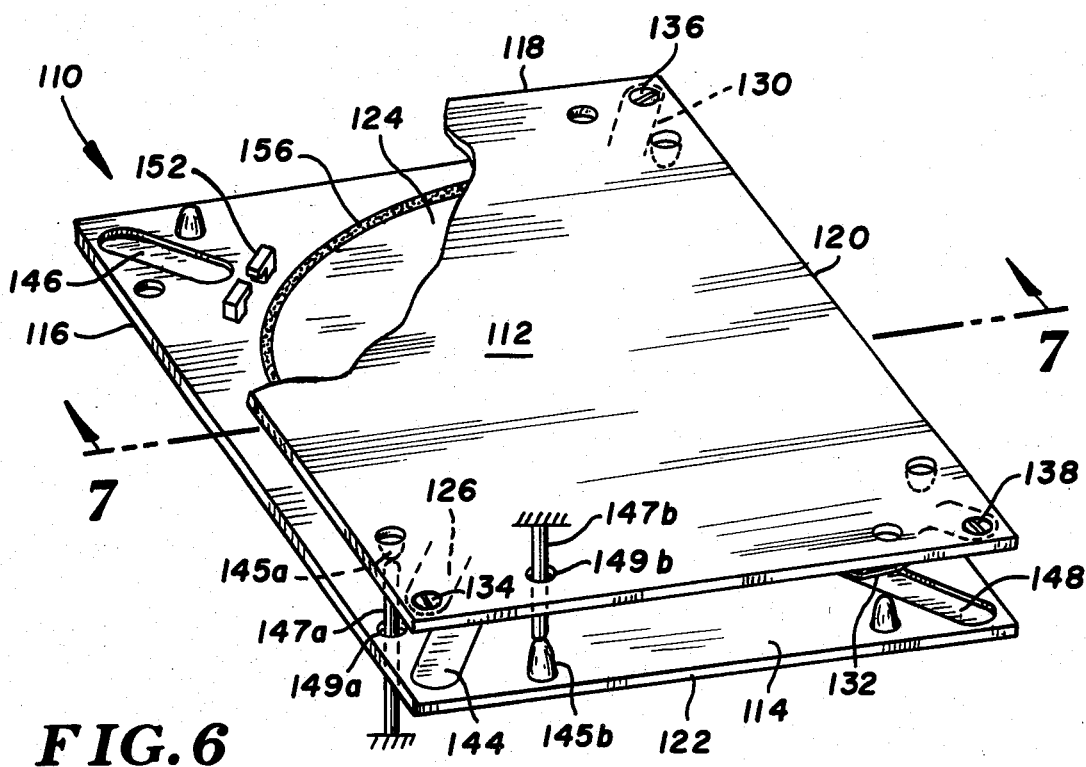
FIG. 6 is a perspective view of a disk cartridge construction illustrating a second embodiment of the present invention.

A second embodiment of the present invention is a cartridge assembly 110, shown in perspective view in FIG. 6. Cartridge assembly 110 includes a first housing section or top cover 112 and complementary second housing section or bottom cover 114. The cartridge assembly is square, having four substantially identical edges 116, 118, 120, and 122. A magnetic disk 124 is located between the two cartridge covers, as are four elogate leaf spring assemblies at 126, 128, 130 and 132, which together comprise a connecting means for maintaining the top and bottom covers aligned with one another and continually urging the covers toward each other. The spring assemblies are oriented diagonally with respect to the cartridge covers.

Each spring assembly is anchored to top cover 112 with a flat head screw and corresponding internally threaded plate. Three of the flat head screws are shown in FIG. 6 at 134, 136, and 138, while two of the plates, 140 and 142, are visible in FIG. 7. The final flat head screw is shown at 143 in FIGS. 7 and 9. The springs are pre-biased and cooperate to continually urge covers 112 and 114 toward each other to keep the cartridge assembly closed when not loaded into a disk drive. In response to a forcing means, for example a set of pins at each cartridge corner, covers 112 and 114 are separated from one another when cartridge assembly 110 is mounted in the drive. Each set of pins includes two diagonally opposite cartridge pins mounted to covers 112 and 114 respectively, and two drive mounted pins, one associated with each cartridge pin. One such set, illustrated in FIG. 6, includes cartridge pins 145a and 145b, and drive mounted pins 147a and 147b which pass through openings 149a and 149b in order to contact their respective cartridge pins. In addition to opening the cartridge, these pins maintain the alignment of covers 112 and 114.

Formed in bottom cover 114 are four diagonal channels, three shown at 144, 146, and 148, each designed to accommodate its associated spring assembly, screw and plate. Near the inward end of each diagonal channel is a spring guide, two of which are shown at 152 and 154. The guides control movement of the spring assemblies relative to bottom cover 114 during opening and closing of the cartridge. Mounted to the inside surface of bottom cover 114 at its outer edge is a flexible sealing means or gasket 156, which runs along the perimeter of disk 124.

Figure 7:
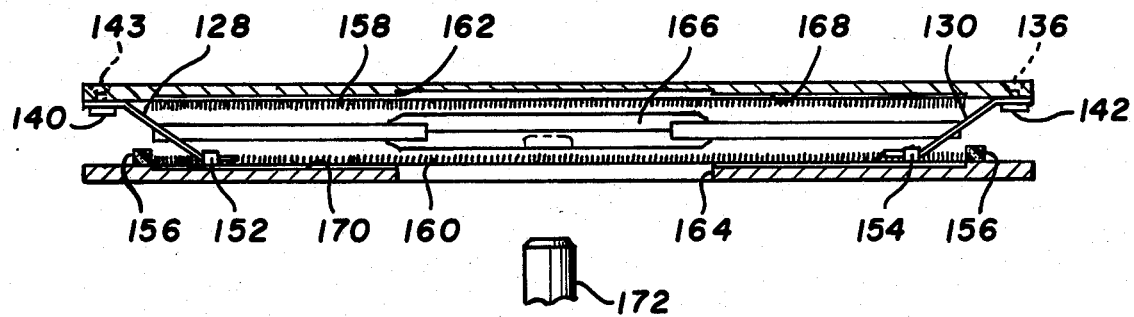
FIG. 7 is a sectional view taken along the line 7—7 in FIG. 6.

FIG. 7 shows first and second resilient liners 158 and 160 mounted to the inside surfaces of the top and bottom covers, respectively. Liners 158 and 150 are annular and positioned to be compressed by, and in contact with substantially the entire surface of, disk 124 when the cartridge is closed. Circular openings at the centers of the liners are aligned with a hub recess 162 and a spindle opening 164 to accommodate a hub 166, for access to a spindle 172. The liners are seated within liner recesses 168 and 170 formed respectively in the top and bottom covers. An inner sealing ring can be attached to the bottom cover along the rim of spindle opening 164, should the hub and liner 160 not provide an adequate seal.

Figure 8:
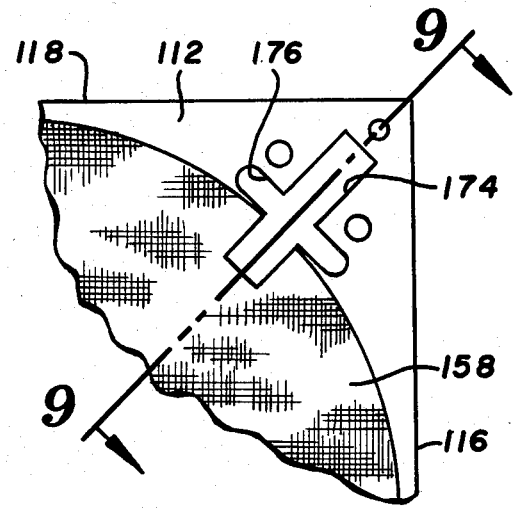
FIG. 8 is a bottom plan view of part of the upper cartridge section of the cartridge of FIG. 6.

One of the four identical corners of top cover 112 is shown in FIG. 8, with spring assembly 128 and disk 124 removed. A depression formed in cover 112 includes a longitudinal recess 174 for accommodating the spring assembly, and a transverse recess 176 that accommodates guide 152. Identical depressions are provided in the remaining corners, each oriented diagonally, with its longitudinal recess extending radially of disk 124.

Figure 9:
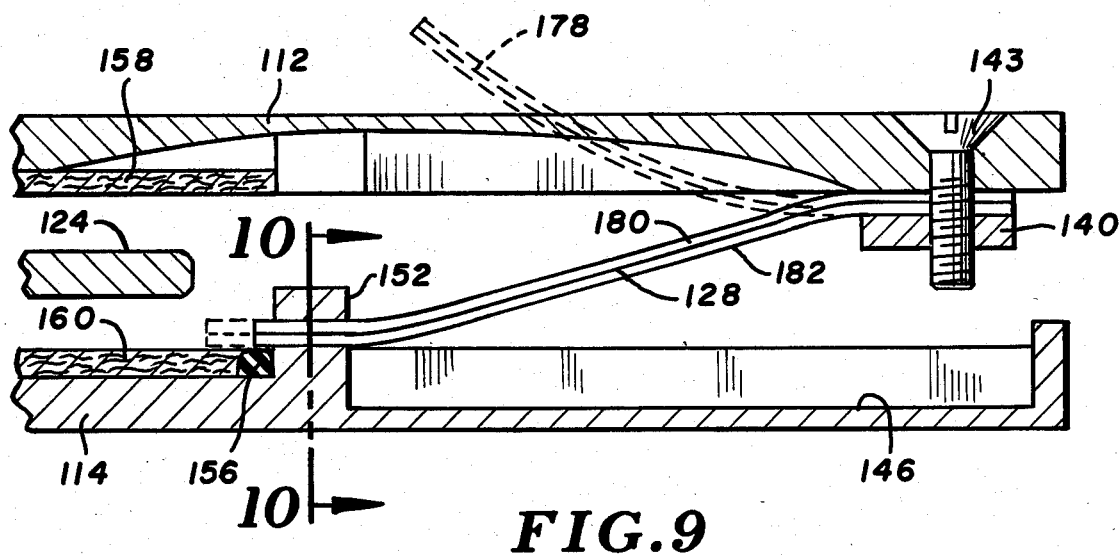
FIG. 9 is a sectional view taken along the line 9—9 in FIG. 8, inverted and showing parts of the upper and lower cartridge sections.

FIG. 9 shows in greater detail the cartridge assembly structure at the corner shown in FIG. 8, substantially identical structure being found at each corner. The cartridge is shown in its open position. Nonetheless, it is understood that with the cartridge closed, longitudinal recess 174 provides clearance for spring assembly 128 and transverse recess 176 provides clearance for guide 152. Diagonal channel 146 provides room for the spring assembly and for screw 143 and plate 140. Liners 158 and 160 are seated in recesses 168 and 170, respectively. Screw 136 and plate 140 cooperate to mount spring assembly 128 to the top cover.

When under no stress, spring assembly 128 would assume a normal configuration shown by the broken lines at 178. Consequently even when cartridge assembly 110 is closed, spring assembly 128 and the remaining three spring assemblies urge the top and bottom covers against one another and readily overcome the opposing force of the gasket and liners.

While a square cartridge with diagonal springs affords four-sided functional symmetry, a challenge encountered with such design is the reduced available space for the springs and the resulting need to shorten them, as compared to the parallel springs in cartridge assembly 10. Leaf spring thickness is a key factor in the ability of the spring assemblies to positively hold the covers closed. However, a shorter leaf spring must undergo greater bending per unit length to achieve the same separation between covers 112 and 114 when the cartridge is open. Given the same thickness, the extra bending increases the probability of unwanted plastic—rather than elastic—deformation, and permanent damage to the springs. To eliminate this problem, leaf spring assembly 128 includes two leaf springs, an upper leaf spring 180 and a lower leaf spring 182. Together, springs 180 and 182 have the desired thickness, and yet are permitted to slide longitudinally with respect to one another, over all their contiguous surface area except that proximate screw 143. This allows use of a shorter leaf spring assembly than would be the case with a single leaf spring. The dual leaf spring structure facilitates the diagonal orientation of the four leaf spring assemblies.

Figure 10:
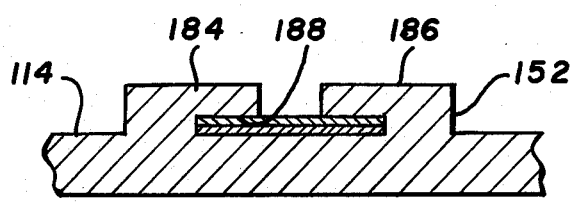
FIG. 10 is a partial sectional view taken along the line 10—10 in FIG. 9.

Spring guide 152, as shown in FIG. 10, includes first and second fingers 184 and 186. The inside surfaces of these fingers, together with the inside surface of bottom cover 114, define a slot 188 through which the inward end of leaf spring assembly 128 is inserted. Slot 188 enables simple, low cost assembly of cartridge assembly 110. Further, as leaf spring assemblies 126, 128, 130 and 132 all are directed diagonally inward with each leaf spring assembly oriented 90 degrees with respect to its neighboring leaf spring assemblies, the tendency for any of the leaf spring assemblies to slide transversely with respect to its retaining slot is avoided. Thus, the leaf spring assemblies and associated guides cooperate to maintain top and bottom covers 112 and 114 in alignment with one another, as well as continually urging them toward one another to the closed position.

When removed from the drive, the cartridge is closed under the force of the leaf spring assemblies, compressing gasket 156 between the top and bottom covers, compressing first resilient liner 158 between disk 124 and top cover 112, and compressing second resilient liner 160 between the disk and bottom cover 114. In this manner, disk 124 is maintained immobile with respect to the cartridge assembly. Also, the gasket accommodates any imperfections in the contiguous area between the inside surfaces of the top and bottom covers, thus to prevent dust and other foreign matter from entering cartridge assembly 110 when it is closed.

The diagonal orientation of the leaf spring assemblies imparts to the cartridge assembly a four-sided functional symmetry. Any one of edges 116, 118, 120 and 122 may be the leading edge as the cartridge is inserted into the drive, with no effect on data reading or writing efficiency.

Thus a connecting means is provided for continually urging two opposed sections of a cartridge assembly toward one another into a closed position, and also for maintaining the two sections in axial alignment with one another. Both sections include resilient liners contiguous with the disk over substantially its entire surface area. When the cartridge assembly is closed, the liners are slightly compressed to maintain the disk stationary within the cartridge assembly. A flexible gasket accommodates any irregularities at the interface between the two sections to prevent entry of dust and particulate matter into the cartridge assembly when the same is closed. The use of leaf springs as a flexible connecting means permits the separation of opposing sections when the cartridge assembly is loaded into a disk drive. This eliminates the need for special windows to accommodate transducer arms, providing a generous window which easily accommodates either a rotary or linear actuated arm. This feature provides such window along at least two opposing edges of a rectangular cartridge; and along all four edges of a square cartridge when the leaf springs are positioned diagonally.

What is claimed is:

1. An information storage apparatus including:
   an information storage medium and a housing enclosing said medium, said housing including first and second housing sections opposed to one another, and a connecting means for maintaining said housing sections in an axial alignment with one another and for urging said housing sections toward one another in the axial direction to a closed position;
   a retaining means comprising a first lining means at the inside surface of said first housing section and a second lining means at the inside surface of said second housing section, said first and second lining means engaging the medium at opposite sides thereof over a substantial portion of the medium surface area whenever the housing is in the closed position, and thereby substantially preventing any movement of the medium with respect to the housing;
   said connecting means being flexible in the axial direction to permit movement of said sections axially away from one another to disengage said retaining means from said storage medium and permit movement of said medium with respect to the housing.

2. The apparatus of claim 1 wherein: said information storage medium comprises a rotatable magnetic disk.

3. The apparatus of claim 1 wherein: said first and second lining means comprise respectively a first resilient liner attached to said first section, and a second resilient liner attached to said second section, said liners at least slightly compressed from their normal configuration when said housing is closed.

4. The apparatus of claim 3 wherein: said first and second liners are constructed of a non-woven cloth.

5. The apparatus of claim 1 wherein: said connecting means include a plurality of elongate leaf springs, each connected at one end to said first housing section and at its other end to said second housing section; and said leaf springs are pre-biased to continually urge said first and second sections toward one another.

6. The apparatus of claim 5 wherein: said housing is rectangular and said plurality of leaf springs comprise two pairs of leaf springs, one pair proximate each of two opposed edges of said housing and parallel to said edges.

7. The apparatus of claim 6 wherein: one end of each leaf spring is fixed to one of said sections, and the opposite end of each leaf spring is slideably engaged with respect to the other of said housing sections.

8. The apparatus of claim 7 including: means defining a plurality of channels and a plurality of pockets in said other housing section, one pocket associated with each channel, for receiving and positioning said opposite ends of said leaf springs, each pocket open to its associated channel through a window having a height and width slightly greater than the thickness and width of its associated leaf spring so as to substantially limit said spring to sliding movement relative to said window.

9. The apparatus of claim 5 wherein: said housing is square and said plurality of elongate leaf springs comprise four leaf spring assemblies, one assembly at each corner of the housing and directed diagonally inward thereof.

10. The apparatus of claim 9 wherein: each leaf spring assembly includes two leaf springs adjacent one another and slideable with respect to one another over at least a portion of their contiguous surface area.

11. The apparatus of claim 9 wherein: one end of each leaf spring assembly is fixed to one of said housing sections and the opposite end of each leaf spring assembly is slideably engaged with respect to the other of said housing sections.

12. The apparatus of claim 11 including: a plurality of guides mounted to said other housing section, one guide associated with each leaf spring assembly, each guide cooperating with the inside surface of said other housing section to define a slot through which said opposite end of its associated leaf spring assembly is received, the height and width of said slot being slightly greater than the thickness and width of the associated leaf spring assembly.

13. The apparatus of claim 1, wherein the first and second lining means are sized such that each engages its respective medium side over substantially all of the surface thereof.

* * * * *